Figure 1:
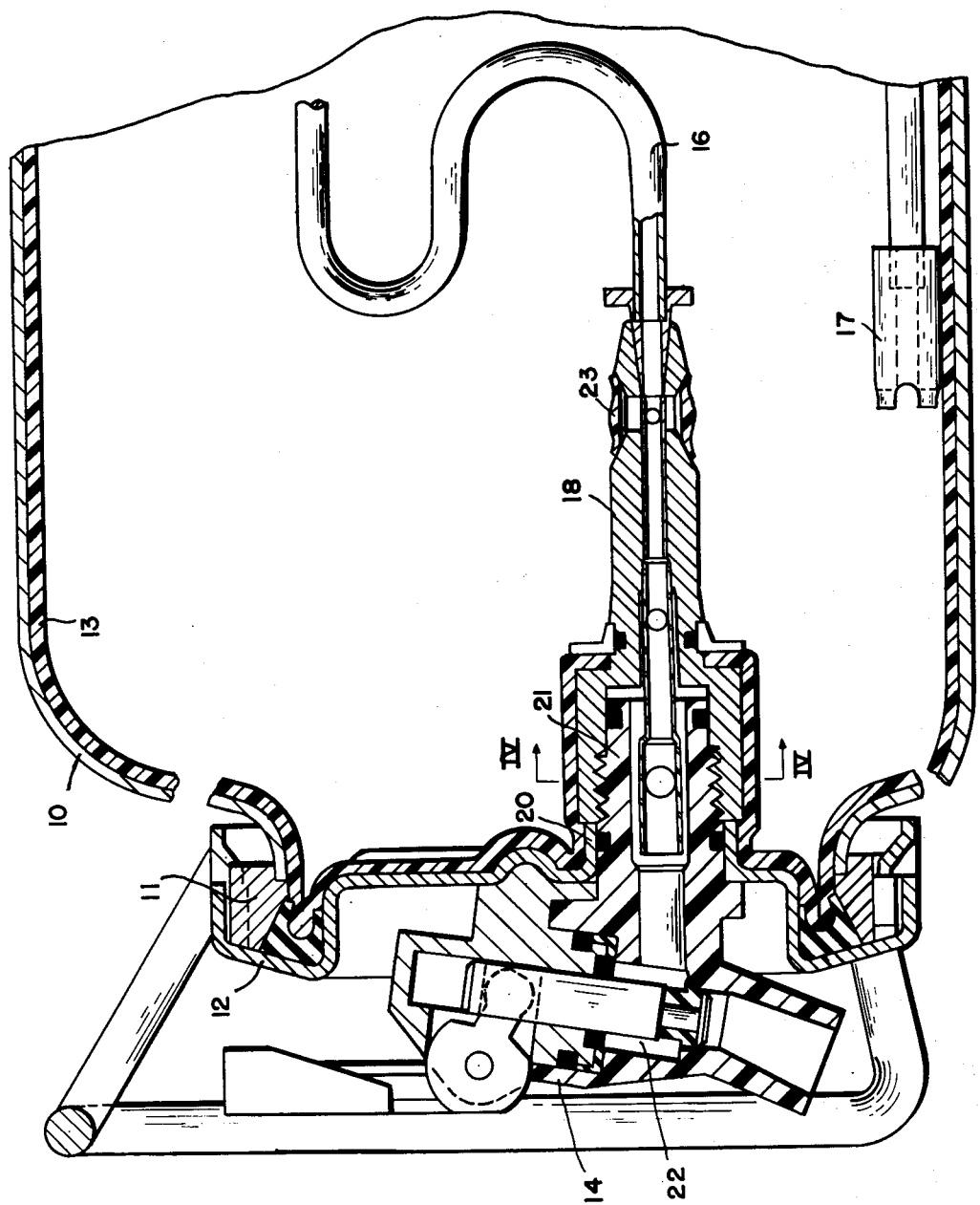

June 16, 1964   F. WELTY ETAL   3,137,326
METHOD AND APPARATUS FOR DISPENSING CARBONATED
BEVERAGES FROM BULK CONTAINERS
Filed Sept. 15, 1960   2 Sheets-Sheet 1

INVENTORS
FRANK WELTY
RAYMOND WELTY
BY Francis J. Klempay
ATTORNEY

June 16, 1964　　　　F. WELTY ETAL　　　　3,137,326
METHOD AND APPARATUS FOR DISPENSING CARBONATED
BEVERAGES FROM BULK CONTAINERS
Filed Sept. 15, 1960　　　　　　　　　　　2 Sheets-Sheet 2
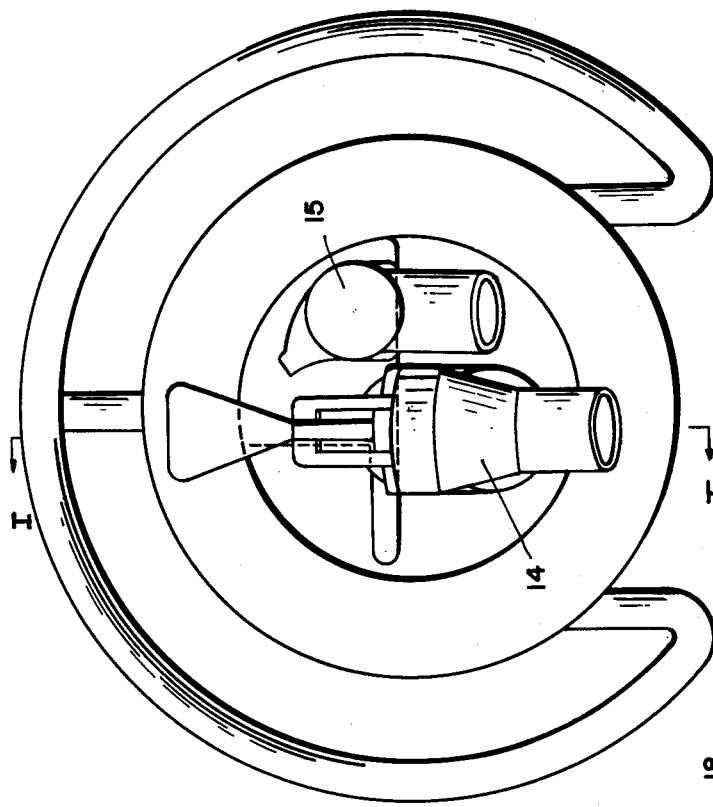
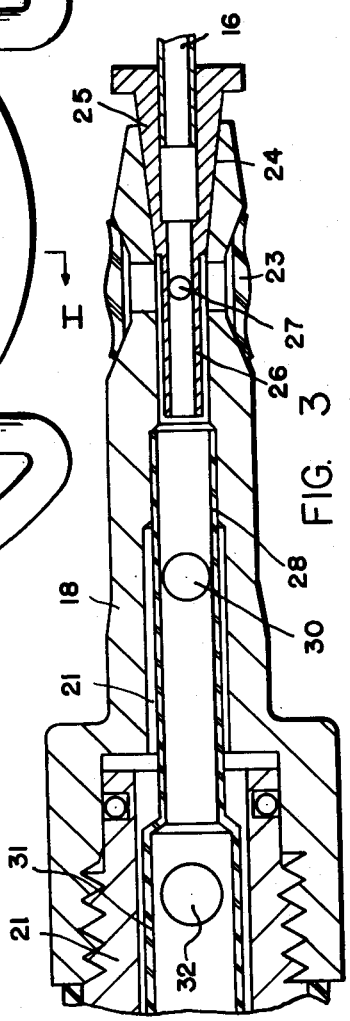
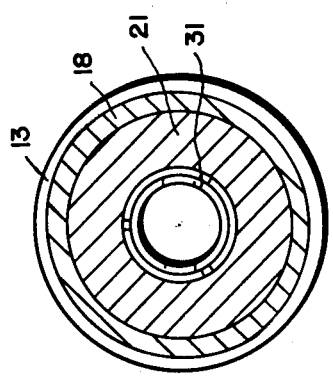
INVENTOR
FRANK　WELTY
RAYMOND　WELTY
BY *Francis J. Klempay*
ATTORNEY

United States Patent Office 3,137,326
Patented June 16, 1964

3,137,326
METHOD AND APPARATUS FOR DISPENSING CARBONATED BEVERAGES FROM BULK CONTAINERS
Frank Welty, 4962 Lockwood Blvd., and Raymond D. Welty, 4307 Lake Road, both of Youngstown, Ohio
Filed Sept. 15, 1960, Ser. No. 56,244
3 Claims. (Cl. 141—18)

The present invention relates to improved methods and apparatus for dispensing carbonated beverages from transportable bulk containers, particularly of the kind in which the container is pre-charged with compressed gas or air whereby the beverage may be controllably expelled from the container under the pressure thus provided in the container. It is proposed by the present invention to advance the art of distributing in bulk prepared carbonated beverages such as beer and cola drinks, for example, to eliminate the necessity of employing large quantities of cans or bottles, while yet providing a dispensing container which is compact and has a total space to beverage volume ratio of such practicality as to allow the container to be stored and kept cold in a household refrigerator. The primary object of the invention is the provision of improved apparatus for carrying out the above distribution method, and of improved procedures for preparing such apparatus to receive the beverage at the brewer's or at the bottler's plant. The teaching of the present invention is concerned primarily with structural features of apparatus and with procedures for conditioning the apparatus to receive the beverage designed to overcome the known serious problem in such systems of preventing excess foaming when beer is dispensed or excessive loss of carbonation when cola drinks, for example, are dispensed.

To satisfy the practical requirements of the above outlined beverage distributing system in a practical sense, it is desirable that the pre-charged transporting container have a capacity of somewhat of the order of nine quarts so that the containers may be readily handled, be easily stored in a household refrigerator, while yet having substantial capacity to make the transporting of the container worthwhile. Thus, the container will normally be removed from the refrigerator on successive occasions for dispensing of the beverage, which usage, in conjunction with the possibility that the beverage itself will have widely varying temperatures and pressures at time of dispensing, makes for an exceedingly difficult problem of building and operating the dispensing portions of the system in such manner that excessive foaming or loss of carbonation is avoided. It is well known that in the case of carbonated beverages generally lower temperatures and higher pressures make it easier to retain more of the gas in the liquid while in the case of beer, agitation of the contents, as may result from removal of the container from the refrigerator, promotes foaming of the beer in the dispensing faucet.

It is a further object of the invention to provide the above improvements while yet restricting the necessary apparatus and the desired procedures on the preparation of the apparatus to receive the beverage to relatively simple compact devices and to simple tasks whereby the overall distribution costs are kept to a minimum.

The above and other objects and advantages of the invention will become apparent upon consideration of the following specification and the accompanying drawing wherein there is disclosed preferred embodiments of the apparatus of the invention and of the novel methods of preparing the apparatus to receive the beverage from the brewer or bottler.

In the drawing:
FIGURE 1 is a partial longitudinal section through an assembled beverage storing and dispensing unit capable of use in the home;
FIGURE 2 is a front view of the apparatus of FIGURE 1;
FIGURE 3 is a longitudinal section, on an enlarged scale, of the portion of the apparatus of FIGURE 1; and
FIGURE 4 is a sectional view taken along the line IV—IV of FIGURE 1.

In accordance with proposals heretofore made for distributing carbonated beverages, we provide a lightweight tank 10 preferably made of stainless steel and having at one end an enlarged opening surrounded by a bezel ring 11 permanently fixed to the tank and having lugs to cooperate with the closure cap 12 whereby the latter may be tightly affixed to the tank. This construction is more fully shown in our co-pending application Serial No. 24,833 filed April 26, 1960. Also, in accordance with the disclosure of this co-pending application, positioned within the tank is a collapsible bag 13 which is fabricated from strong impermeable plastic material to provide a barrier between the beverage contained within the bag and a compressed expelling gas, normally air, which is interposed between the tank and the bag. Also, in accordance with the disclosure of said co-pending application we provide, on the face of the cap 12, a dispensing faucet 14 and combined relief and expellant charging valve 15.

The apparatus of the present invention is concerned with improved passage or conduit means to bring the liquid from the body of the same stored in the bag 13 into the discharge chamber of the faucet 14 in such manner that "break-out" of the carbonating gas is eliminated or at least greatly minimized so that beer foaming at the faucet or material loss of carbonation in the case of other drinks is avoided even under conditions of high temperature or pressure and agitation of the beverage. In general accordance with prior practice we provide within the bag 13 a flexible restriction tube 16 which is connected at its inlet end to a weighted inlet fitting 17 and at its outlet end to a fitting 18 which leads to faucet 14. For reasons to be later described, the tube 16 in the present apparatus may be much shorter than that heretofore employed in similar apparatus.

The removable cap member 12 is formed with an integral inwardly directed flanged opening 20 in which is received the shank 21 of a molded plastic body of the dispensing faucet 14. As shown, the shank 21 has a longitudinally disposed bore which leads into a cavity 22 of the valve 14 from which cavity the beverage is dispensed by gravity downwardly through a valved opening in the bottom wall thereof. Shank 21 is exteriorly threaded inward of the cap 12 to receive the fitting 18 and suitable sealing rings, as shown, are interposed between the shank and fitting and between the shank and flanged opening in cap member 12 to provide a fluid-tight assembly. Fitting 18 is formed with a thru-bore to the inner or inlet end of which is connected the flexible restriction tube 16. As is well understood in the art, the function of the tube 16 is to dissipate most of the static fluid pressure which is existent in the beverage upon entering the inlet fitting 17 and which may be of the order of 120 pounds per square inch when the container is substantially full of beverage and the volume of the compressed expellant is relatively small. However, since it is desired to secure a substantially full flow upon opening of the valve 14 the beverage issuing from the tube 16 must flow at a fairly rapid rate—the static energy of the initial fluid pressure being transposed into kinetic energy of the moving beverage at the discharge end of tube 16.

Heretofore, the translation of the rapidly moving beverage flow at the discharge of the restriction tube into a large-volume low-velocity flow at the dispensing faucet without excessive foaming or loss of carbonation has been most difficult. We have observed that if at any point along this translational flow conditions are such as to initiate any freeing of the carbonating gas, even in minute quantities, the bubbles or voids thus formed seem to encourage further and more voluminous escape of free gas and the resultant foaming or loss of carbonation progresses at a rapid rate. It should be understood that beverages such as beer have a rather tenacious surface tension so that, upon ebullition of the gas, multiple bubbles are succesively formed which causes foaming. In the case of other carbonated drinks, where the percentage of organic flavoring or coloring ingredients is less, foaming does not not so readily occur although the escape of carbonating gas, once started, also progresses very rapidly. It is the fundamental purpose of the present invention to prevent, insofar as possible, any initial "break-out" of the carbonating gas from the beverage during the movement of the beverage from the restriction line in the container assembly to the flow filling the consumer's glass. The method and apparatus of the invention designed to accomplish this stated result will now be described.

While it is more obvious that agitation or violent impingement of the flowing beverage causes foaming and loss of carbonation, our experiments show that gas "break-out" may begin in micoscopic volumes along the beverage-containing surfaces of the dispensing system, and that once this ebullition is initiated, it proceeds and grows rapidly to disturb the flow and cause foaming or serious loss of carbonation. Thus, a thoroughly sterilized and wetted open glass will retain water charged with four or five volumes of $CO_2$ with very little ebullition. If, however, the sterilized glass is allowed to dry before the charged water is put into it, there is a much greater loss of the gas. It is believed that due to the surface tension characteristic of the liquid, minute voids are formed about microscopic dust particles and that gas "break-out" is initiated into these voids. Also, experiments have shown that impurities in the material of the containing surfaces encourage the initiation of ebullition of the gas. For example, machineable stainless steels of current manufacture contain appreciable sulphur which is not only a source of taste contamination but it also contributes to the initiation of gas ebullition. For the same reasons, untreated rubber sealing rings are objectionable.

To overcome the above objections, we have found that unexpectedly good results are obtained by first treating all the passages in the beverage dispensing system which may contain the stainless steel and rubber parts with suitable detergents and acids to remove all organic material, dust, surface sulphur etc., after which the parts are soaked for a long period of time—twenty to forty hours, for example—in a medium strength phosphoric acid solution. Thereafter the parts are rinsed with clean sterile water and are kept wet continuously up to the time that beverage is stored in them which in the case of the particular apparatus disclosed in the present application is when the space within the bag 13 is filled with beverage by injection through the faucet 14. A resilient expandable ring 23 housed in an annular groove formed in fitting 18 and communicating with the longitudinal bore therein is provided to allow rapid filling of the container through the open faucet 14. A measured quantity of beverage is thus injected, and it should be apparent that upon subsequent closing of the faucet 14 all the dispensing passages inwardly of the valve at the bottom wall of cavity 22 will remain filled with liquid until the container is subsequently empty. We have found that this treating of the passages with phosphoric acid and the subsequent continuous wetting of the passages very greatly reduces the unstable tendency of the dispensing system to trigger off foaming and substantial loss of carbonation from the liquid being dispensed.

To eliminate impingement of the beverage as it issues in a jet-like stream from the tube 16, we specially construct the passage through fitting 18 leading to valve 14 in a manner shown representatively and more clearly in FIGURE 3 of the drawing. Thus, fitted into a taper 24 in the inlet end of fitting 18 is a tubular member 25 having an inward extension 26 spaced radially inward from the bore through fitting 18 and having a number of circumferentially spaced apertures 27 in its side wall aligned with radial apertures in the fitting 18 which lead to the groove containing the ring 23. Member 25 also forms a connection for tube 16, as shown.

Inwardly of the end of extension 26 the bore through fitting 18 is enlarged to tightly receive one end of a tubular member 28. The bore through fitting 18 is further enlarged to provide an annular interstice between the bore and a portion of the tube 28, and within this portion there is formed a plurality of apertures 30. The inner end of tube 28 is expanded as shown at 31 to provide a thin interstice betwen the bore through shank 21 of the valve 14 and the peripheral surface of this expanded portion of tube 28. Apertures 32 are formed in the side wall of this expanded portion 31 of the tube 28.

In the operation of the passage assembly described immediately above, the rapidly moving liquid issuing from the tube 16 is first divided by the apertures 27 in tubular member 25 into two streams, the first being a solid stream within extension 26 and the second being an annular stream surrounding the extension 26. The liquid which goes out through the apertures 27 makes two right-angled turns and in doing so dissipates most of its kinetic energy. The annular stream thus moves much slower than the solid stream and as it enfolds the latter at the discharge of extension 26 it dampens the flow of the latter without any abrupt impingement. This process is repeated in substantially the same manner by the tube 28 so that as the liquid arrives at the cavity 22 of the faucet 14 its velocity and pressure are reduced to the point that the flow is quiet and slow. Faucet 14 is of the kind described and claimed in our co-pending application Serial No. 826,958 filed July 14, 1959, now Patent No. 3,082,783, dated March 26, 1963, wherein the parts are so proportioned that the inlet bore and the cavity 22 are so proportioned in relation to the valve outlet and that cavity 22 always remains filled with liquid while the discharge from the faucet is substantially under free gravity flow conditions. We believe that the primary merit of the conduit system disclosed herein lies in the fact that the kinetic energy in the moving jet stream of the liquid issuing from the tube 16 is dissipated in the right-angled turns effected by the openings 27, 30 and 32 and in the fact that the resultant confined flow increases the friction to further reduce kinetic energy. Under certain conditions we have found that the discharge ends of tubes 25 and 28 may be closed off entirely without appreciable increase in foaming or loss of carbonation although it should be recognized that, depending on the internal diameter of tube 16 and its length, the volume of flow may be thereby somewhat restricted.

In using the assembled apparatus described above, and immediately prior to the refilling or recharging of the assembly, all the parts are, of course, thoroughly cleaned and sterilized and then reassembled into the unit shown in FIGURE 1. Of course, the phosphoric acid aging step need not be employed after the first use of the apparatus, and the inner surface of the bag 13 may either be cleaned or a new sterile bag inserted in the assembly. In any case we have found it very desirable that all the beverage dispensing passages be thoroughly cleaned and wetted before the carbonated beverage is reintroduced into the container. As explained more fully in said co-pending application Serial No. 24,833, an expellant is first introduced into the assembly through valve 15 which collapses the bag 13, expelling practically all the air which may be contained therein. At this stage the dispensing faucet 14 is, of course, open. A tube, not shown, for delivering beverage under pressure is now inserted in the discharge taper of faucet 14 and with the faucet remaining open the bag 13 will be filled with a measured quantity of beverage against the back pressure of the expellant, and this back pressure may be controlled either by suitable relief means associated with the conduit, not shown, previously attached to valve 14 or by the valve 15 itself which is a relief valve. It should be observed that the wetted dispensing passages are completely filled with the beverage immediately upon the start of beverage charging and that these passages remain so filled continuously down to the time that the container is emptied of beverage. Thus, not only are sterile and sanitary conditions maintained but the dispensing passages are so continuously conditioned that there is little or no opportunity for the initiation of ebullition of carbonating gas from the beverage. By the use of the methods and apparatus herein disclosed, it is possible to always draw beer without excessive foaming and to always draw other carbonated beverages with a low loss of carbonation. It should therefore be readily apparent that the teachings of our invention accomplish the objects initially set out above.

Having thus described our invention, and being mindful that various changes may be made in the details and arrangement of the specific embodiments disclosed, reference should be made to the appended claims in determining the nature and scope of our invention.

We claim:

1. In apparatus for dispensing a carbonated beverage from a pressurized supply source of the same comprising a dispensing faucet, an elongated small-diametered conduit to receive the beverage from said source and through which the beverage flows to dissipate the static pressure of the source, a fitting interposed between the discharge end of said conduit and said faucet and having a bore extending therethrough to provide a passage for the beverage discharged from said conduit, said bore being of increasing cross-sectional area in the direction of fluid flow, and a pair of longitudinally spaced tube-like inserts in said bore each adapted to receive the flow of liquid at its inlet end and each being open at its outlet or downstream end, each of said inserts having portions extending upstream from their downstream ends spaced inwardly from the adjacent surfaces of said bore to provide annular passages for liquid, and each of said inserts having at least one radial aperture in said portion to divert at least a portion of the liquid stream entering the inlet into said annular passage the arrangement being such that the solid stream of liquid issuing from the discharge end of each insert is engulfed by the annular stream of liquid issuing from the annular interstice formed by the bore of said fitting and an adjacent portion of the insert.

2. For use in a portable pressurized container for transporting and dispensing carbonated beverages and wherein a manually valved faucet is carried by a wall of the container for charging the container with beverage and for dispensing the same into a consumer's glass, an elongated fitting housed within the container and having a bore therethrough to receive beverage stored within the container and to deliver the same to said faucet, said bore being of increasing cross-sectional area in the direction of fluid flow when the beverage is being dispensed, an annular groove in said fitting adjacent its dispensing inlet end and radial apertures interconnecting said bore and groove, a resilient deformable annular valving element in said groove, a tube anchored in said bore intermediate said groove and the dispensing inlet end of said bore and having an integral extension extending in said direction of fluid flow past said radial apertures and into the bore beyond said apertures, said extension being of smaller diameter than the adjacent diameter of the bore to provide an annular passage for liquid, and radial apertures in said extension substantially aligned with the radial apertures in said fitting, the arrangement being such that upon the charging of beverage into said container through said faucet fluid may flow into said groove and out past said valving element whereas during dispensing of the beverage the beverage flows both in a solid stream through the center of said tube and in an annular stream about said tube with said streams being reunited at the downstream end of said tube.

3. In apparatus for dispensing a carbonated beverage from a pressurized supply of the same comprising a dispensing faucet, an elongated small-diametered conduit to receive the beverage from said source and through which the beverage flows to dissipate the static pressure of the source, a fitting interposed between the discharge end of said conduit and said faucet and having a bore extending therethrough to provide a passage for the beverage discharged from said conduit, said bore being of increasing cross-sectional area in the direction of fluid flow, and a tube-like insert in said bore having a downstream end portion concentric within and spaced radially inward of the side wall of an enlarged portion of said bore, said tube-like insert being open at either end and having means whereby beverage entering said bore is divided into one solid stream concentrically within said insert and a second stream which is annular in cross section and outside of said insert, the arrangement being such that the solid stream of fluid issuing from the discharge end of said insert is engulfed by said annular stream to thereby kill the velocity of the said solid stream.

References Cited in the file of this patent

UNITED STATES PATENTS

| | | |
|---|---|---|
| 2,091,042 | Hedges | Aug. 24, 1937 |
| 2,125,102 | Cornelius | July 26, 1938 |
| 2,423,155 | Phillips | July 1, 1947 |
| 2,458,230 | Warcup | Jan. 4, 1949 |
| 2,609,984 | Barnes | Sept. 9, 1952 |
| 2,811,390 | Kiraly | Oct. 29, 1957 |
| 2,872,281 | Kahler | Feb. 3, 1959 |
| 2,900,222 | Kahler | Aug. 18, 1959 |